United States Patent Office 3,513,412
Patented May 19, 1970

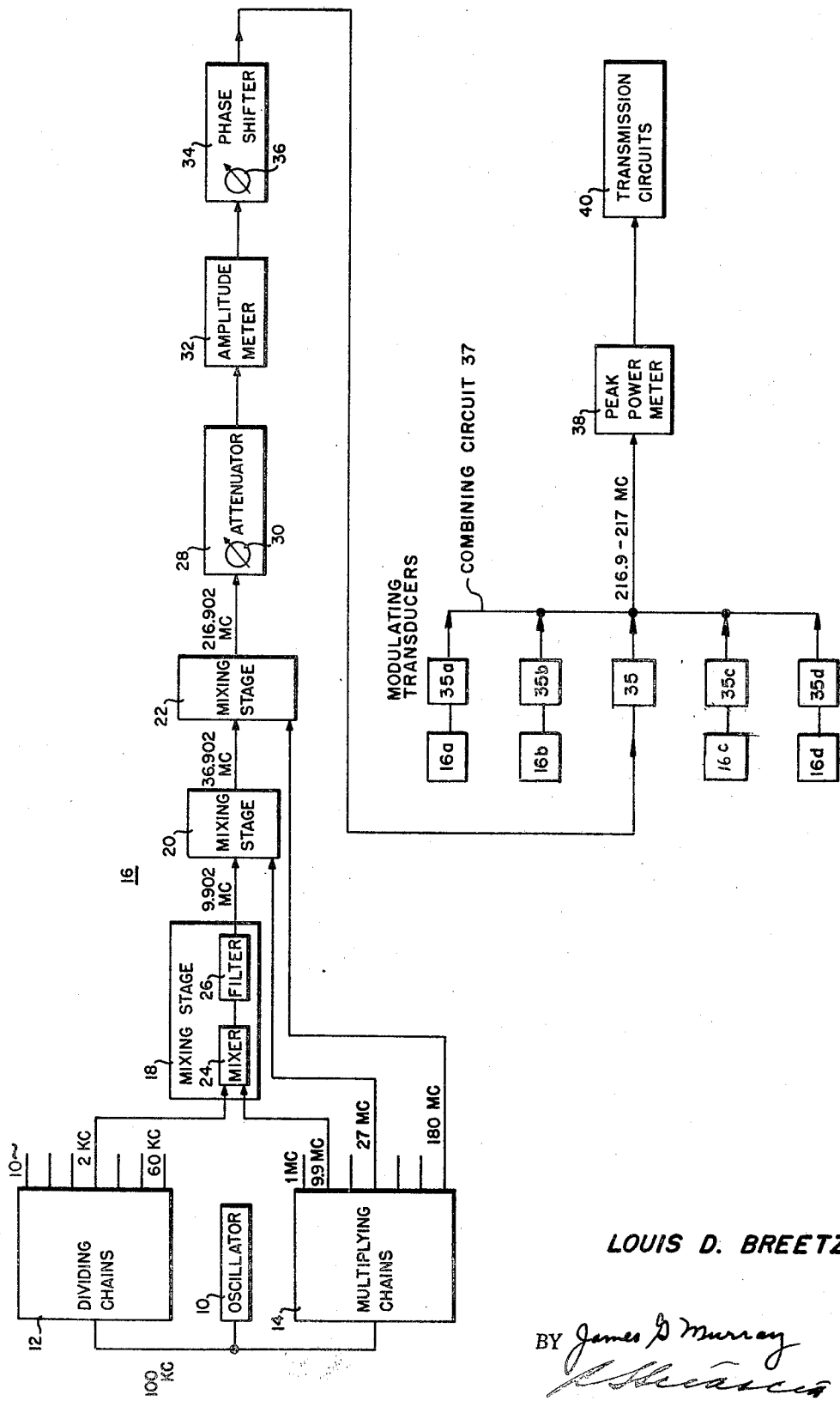

3,513,412
MINIMUM PEAK POWER SIGNAL SYNTHESIZER
Louis D. Breetz, Oxon Hill, Md., assignor to the United
States of America as represented by the Secretary of
the Navy
Filed Sept. 28, 1966, Ser. No. 583,129
Int. Cl. H03b 19/00; H03d 7/16
U.S. Cl. 332—23                                    4 Claims

ABSTRACT OF THE DISCLOSURE

A signal synthesizer having a plurality of phase and amplitude controls for varying individual phase coherent signals to minimize the peak power of the signal obtained by combining the individual signals.

The invention described herein may be manufactured and used by or for the Government of the United States of America for governmental purposes without the payment of any royalties thereon or therefor.

The present invention relates to a signal generating system and more particularly to a signal synthesizing system wherein phase-coherent signal components of different frequencies are produced from a single source and are combined in such a manner that the ratio of peak to average power is minimized.

In the past decade it has become an increasingly popular practice to simultaneously transmit over a single communication link a plurality of informative data, or messages, by combining a large number of different frequency signals, each of which contains information. This practice has been used in such diverse fields as telemetering data to earth from space research vehicles, telephonic microwave systems, satellite surveillance systems, radio communication systems and others. Persons designing such systems have, in the past, been concerned with the conflicting economic interest of using a system with as small a total average power capacity as possible and with the technical necessity of making the system sufficiently powerful to handle a signal wherein the individual component signals are simultaneously at a maximum average power.

The general purpose of this invention is to provide a signal producing system which embraces all of the advantages of the described previous systems but does not require the power capability of handling a signal wherein the component signals are simultaneously peaked. To attain this, the present invention contemplates that the component signals are phase-coherent and produced from a single source and are combined with such a phase relationship that the ratio of peak to average power is minimized and, consequently, the necessary power capability of the transmission circuitry is minimized.

It is, therefore, an object of the present invention to provide an improved signal producing system.

Another object is to provide an improved signal producing system wherein phase-coherent signal components of different frequencies are produced from a single source and are combined in such a manner that the ratio of peak to average power is minimized.

A further object of the invention is the provision of a multi-frequency signal synthesizer which utilizes a single source to produce phase-coherent signals of different frequencies which are then individually delayed, or phase shifted, to be in such a phase relationship that when the phase-coherent signals are combined the ratio of peak to average power of the resultant signal is minimized.

A still further object of the invention is to provide a multi-frequency signal synthesizer which utilizes a single source to produce a plurality of phase-coherent signals of uniquely related frequencies, these signals being individually delayed to be uniquely related in phase, the relationship of frequencies and phase being such that when the phase-coherent signals are combined the resultant signal is repetitive in a relatively short period and has a minimal ratio of peak to average power.

Other objects and advantages of the invention will become more fully apparent from the following description of the annexed sheet of drawing which illustrates the invention in block diagram form. The reader will recognize, of course, that the drawing is intended merely as an aid to understanding the invention and not as a drawing of an operational system. In order to avoid a burdensome complexity of description and drafting, many obviously necessary and conventional stages of amplifying and filtering have not been illustrated. For the same reason the illustration and description have been limited to the apparatus which produces one signal component; the other signal components being produced by apparatus which is similar. Further, it is emphasized that those portions of the description which mention specific numbers, such as the typical values of, and the number of, different frequencies, are merely a reference to forms of the invention which have been used and proven operationally feasible and are not to be considered in any way limiting.

Referring now to the drawing, the numeral 10 identifies a signal source which may be an extremely stable oven controlled, crystal oscillator producing a signal that typically could be of a 100 kc. frequency. Dividing and multiplying chains 12 and 14, respectively, are connected to oscillator 10 and produce a multiplicity of signals. The exact design of the chains 12 and 14 will, of course, be dictated in accordance with conventional practice and by the desired operational characteristics of the system. In one typical form of the invention, the dividing chain 12 produced signals ranging from 10 c.p.s. to 60 kc. and the multiplying chain 14 produced signals ranging from 1 to 180 mc. Since each of the multiplicity of produced signals originate from the same source, that is, oscillator 10, these produced signals are all phase-coherent with relation to each other. Expressed in a slightly different way, the relative phase of these signals is always defined and can be related most easily, perhaps, to the instant when the lowest frequency signal, typically the 10 c.p.s. signal, is positively going through the zero crossover. Further, since all of the frequencies are related so that all combinations of their difference frequencies are divisible by the highest common denominator frequency, the relative amplitude relationship follows a pattern which repeats for all combinations of difference frequencies at the highest common denominator frequency.

Signals from the dividing and multiplying chains 12 and 14 are connected to a plurality of similar channels 16, 16a . . . 16d of which only channel 16 is illustrated in detail. Channel 16 begins with a series of mixing stages 18, 20 and 22, each of which stages preferably includes either a balanced modulator or a heterodyning mixer 24 followed by a crystal filter 26. The output signal of the last mixing stage 22 is phase-coherent with, but of a different frequency from, the output signals in the plurality of other channels which are not fully illustrated. In a typical system, a 2 kc. output signal from dividing chain 12 is mixed in stages 18, 20 and 22 with the 9.9, 27 and 180 mc. signals from the multiplying chain to provide stage output signals of 9.902, 36.902 and 216.902 mc. Fourteen similar channels in this typical system, which was operationally limited to a frequency band of 216.9 to 217.0 mc., produced signals at frequencies of 216.9, 216.90001, 216.90002, 216.90004, 216.9001, 216.9002, 216.9004, 216.901, 216.904, 216.91, 216.92, 216.94, 216.96 and 217 mc.

The output signal of the last mixing stage 22 is connected to attenuator 28 which is varied by control 30. The manipulation of control 30 is coordinated by the operator with the indication of amplitude or power meter 32, so that the component signal produced in channel 16 is at the desired power level.

After being properly attenuated, the component signals produced in the plurality of channels are each individually phase shifted. In channel 16 the relative phase of the signal is varied as desired by phase shifter or line stretcher 34 and the control 36. It will be realized, of course, that even after phase shifting, the component signals in the plurality of channels remain phase-coherent.

The outputs of the plurality of channels (in channel 16 this is the output of phase shifter 34) are connected to receive informative variations from modulating transducers 35, 35a . . . 35d and to be combined into a resultant signal in conventional circuitry 37. Further, although only five channels have been shown in the drawing, it will be realized that any number of channels, for example 15, may be used.

The resultant signal, which typically would include 15 phase-coherent component signals in the frequency range of 216.9 to 217 mc., is passed through instrumentation, such as a peak power meter 38 and other meters as desired, to the transmission circuitry 40 which is not a part of this invention. Transmission circuits 40 would, of course, vary according to the particular use being made of the invention. However, as will later be more apparent, the transmission circuits 40 can, because of the already described invention, be designed to a smaller power capacity than was previously possible.

The operation of the invention is probably by now apparent. Prior to connecting the invention to the transmitting circuits 40, the operator sets the desired amplitude level for each of the (typically 15) component signals, as measured by meters 32, by manipulation of attenuator controls 30. At this time the transducers 35, 35a . . . 35d connected to the circuit 27 are all set to provide the minimum expected signal attenuation. An obvious alternative would be to replace the transducers with dummy loads.

In order to minimize the peak power to the resultant signal, as measured by meter 38, the operator shifts the relative phase of each of the (typically 15) component signals by manipulation of controls 36. The proper relative phase of the plurality of component signals for absolutely minimizing the peak power of the resultant signal can be calculated. However, for a large number, such as 15, of component signals, this is a very complex calculation. As a practical matter, in ordinary circumstances, the operator experimentally manipulates the controls 36 to lower the peak power of the resultant signal until an approximation of the minimal peak power of the resultant signal is obtained. Experience has shown that in a typical system, even without attaining the ultimate minimization of the resultant signal, the invention can be readily used to achieve a reduction of the peak power of the resultant signal by a factor of seven. In other words, by use of the invention, the transmission circuits 40 can be designed to a power level of one seventh that which would be necessary if the component signals were not phase-coherent and phase controlled. After setting the controls 36, the transmission circuits 40 are connected to the invention and information is added to the component signals through the transducers 35, 35a . . . 35d.

At this time the invention is in normal operation. The signal from the oscillator 10 is divided, multiplied and mixed by the chains 12 and 14 and by the mixing stages 18, 20 and 22, to provide a plurality, typically 15, of phase-coherent component signals. These phase-coherent component signals are individually varied in amplitude and phase by controls 30 and 36 and are information modulated and combined by the transducers 35, 35a . . . 35d and circuitry 37. The resultant signal is then transmitted by circuits 40 and includes the plurality, typically 15, of information bearing component signals which are at discrete frequencies and can be separated at the receiving station by well known detection and filtering methods. Because of the advantages accomplished by the invention, or more specifically, by the use of phase controlled, phase-coherent component signals, the power capacity of the transmitting circuits 40 may be decreased by a factor of 7 or more without any decrease in the amplitude of the component signals.

The amplitude and phase variations caused by attenuator 28, phase shifter 34 and the amplitude variations caused by the transducers 35, 35a . . . 35d do not disturb the phase-coherent character of the component signals. In other words, the component signals which are combined in circuit 37 are phase related according to a pattern which repeats at the frequency of the highest common divisor of any combination of difference frequencies, typically 10 c.p.s., of the output signals from chain 12. The reader will recognize that the above is true only if, as it usually is, the lowest difference frequency (10 c.p.s.) is divisible into the frequency of all of the other difference frequencies produced by chains 12 and 14 and by channels 16. If this is not so, say that the dividing chain 12 produces difference signals of 10 and 25 c.p.s. which are used in the signal channels 16 to produce component signals of 216.90001 and 216.900025 mc., then the phase relation pattern of the component signals would be repetitive with a frequency of 5 c.p.s., that is at the frequency of the largest common divisor of all of the signals produced in the plurality of channels 16.

It is now evident that there hase been disclosed a multi-frequency signal synthesizer which utilizes a single source to produce a plurality of phase-coherent signals of uniquely related frequencies, these signals being individually delayed to be uniquely related in phase, the relationship of frequencies and phase being such that when the phase-coherent signals are combined, the resultant signal is repetitive in a relatively short period and has a minimal ratio of peak to average power.

What is claimed and desired to be secured by Letters Patent of the United States is:

1. A signal generator comprising:
    an oscillator for producing a first signal of a highly stable frequency;
    dividing means connected to said oscillator for producing a plurality of second signals which are of a frequency lower than said first signal;
    multiplying means connected to said oscillator for producing a plurality of third signals which are of a frequency higher than said first signal;
    mixing means connected to said dividing and multiplying means to receive said pluralities of second and third signals and to produce a plurality of different frequency component signals which are phase-coherent;
    control means connected to receive said plurality of component signals and to individually vary the amplitude and phase of each of said plurality of component signals and
    information modulating and combining means connected to said control means to impart information modulation individually to each of said plurality of component signals and to combine said component signals into a resultant signal.

2. A signal synthesizer comprising:
    an oscillator for producing a first signal of a highly stable frequency;
    dividing means connected to said oscillator for producing a plurality of second signals which are of a frequency lower than said first signal;
    multiplying means connected to said oscillator for producing a plurality of third signals which are of a frequency higher than said first signal;

a plurality of channels connected to said dividing and multiplying means, each channel producing a different frequency, phase-coherent component signal which is information modulation and which is adjustable in amplitude and phase and combining means which are connected to said plurality of channels for combining said component signals into a single resultant signal.

3. A signal synthesizer as set forth in claim 2 wherein each of said plurality of channels includes:

a plurality of series connected mixing stages connected to said dividing and multiplying means;

a variable attenuator connected to said mixing stages;

an adjustable phase shifter connected to said variable attenuator and modulating means connected to said adjustable phase shifter.

4. A signal synthesizer as set forth in claim 3 wherein said mixing stages include a balanced modulator connected to a filter.

References Cited

UNITED STATES PATENTS

| 2,522,368 | 9/1950 | Guanella | 332—22 X |
| 2,572,958 | 10/1951 | Spacek | 332—23 X |
| 2,881,320 | 4/1959 | Goldberg | |
| 2,957,144 | 10/1960 | Huhn | 331—40 |
| 3,212,024 | 10/1965 | King | 331—44 |
| 3,372,347 | 3/1968 | Jones et al. | 331—40 X |

ALFRED L. BRODY, Primary Examiner

U.S. Cl. X.R.

332—19; 331—40, 44; 328—14; 325—156; 324—77